US005170683A

United States Patent [19]

Kawada et al.

[11] Patent Number: 5,170,683

[45] Date of Patent: Dec. 15, 1992

[54] METHOD FOR SURFACE-PROCESSING OF A PHOTORECEPTOR BASE FOR ELECTROPHOTOGRAPHY

[75] Inventors: Sunao Kawada; Masataka Inagi; Masao Itoh; Toyotsugu Itoh; Takayoshi Hashimoto; Shinichi Kawano, all of Tokyo, Japan

[73] Assignee: Konica Corporation, Tokyo, Japan

[21] Appl. No.: 808,369

[22] Filed: Dec. 16, 1991

[30] Foreign Application Priority Data

Dec. 28, 1990 [JP] Japan .............................. 2-417449
Dec. 28, 1990 [JP] Japan .............................. 2-417488

[51] Int. Cl.[5] .............................. B23B 1/00

[52] U.S. Cl. .............................. 82/1.11; 407/119; 407/11

[58] Field of Search .............................. 82/1-11, 82/900, 173, 50; 407/11, 119, 120; 408/145, 56-61; 409/135, 136

[56] References Cited

U.S. PATENT DOCUMENTS

| | | | |
|---|---|---|---|
| 3,745,623 | 7/1973 | Wentorf, Jr. et al. | 407/119 |
| 4,109,737 | 8/1978 | Bovenkerk | 407/119 |
| 4,605,343 | 8/1986 | Hibbs, Jr. et al. | 407/119 |
| 4,720,216 | 1/1988 | Smith | 407/11 |
| 5,002,828 | 3/1991 | Cerceau | 407/119 |
| 5,003,851 | 4/1991 | Kawada et al. | 82/1.11 |
| 5,022,797 | 6/1991 | Sawa et al. | 82/1.11 |
| 5,069,092 | 12/1991 | Schmatz et al. | 407/119 |

FOREIGN PATENT DOCUMENTS

| | | | |
|---|---|---|---|
| 202702 | 11/1983 | Japan | 83/1.11 |
| 62-152642 | 7/1987 | Japan . | |
| 63-264764 | 11/1988 | Japan . | |
| 63-307463 | 12/1988 | Japan . | |
| 1-86151 | 3/1989 | Japan . | |
| 1-86152 | 3/1989 | Japan . | |
| 1-86153 | 3/1989 | Japan . | |
| 1-86154 | 3/1989 | Japan . | |
| 1-86155 | 3/1989 | Japan . | |
| 2-123245 | 5/1989 | Japan . | |
| 1-172573 | 7/1989 | Japan . | |

OTHER PUBLICATIONS

Kalish, Gerbert S., "Status Report: Cutting Tool Materials", *Metal Progress, Nov. 1983, p. 23.*

*Primary Examiner*—Larry I. Schwartz
*Assistant Examiner*—Kevin J. Carroll
*Attorney, Agent, or Firm*—Frishauf, Holtz, Goodman & Woodward

[57] ABSTRACT

A method of surface-processing a photoreceptor base including aluminum material for electrophotography on a lathe, in which a surface of the base is cut by a cutting tool having a sintered polycrystalline diamond body while cutting fluid, composed of water, an aqueous solution of a surface-active agent or an aqueous solution of a water-soluble organic solvent, is being supplied to the surface of the base frame.

14 Claims, 1 Drawing Sheet

METHOD FOR SURFACE-PROCESSING OF A PHOTORECEPTOR BASE FOR ELECTROPHOTOGRAPHY

BACKGROUND OF THE INVENTION

The present invention relates to a method for surface-processing of a base of a photoreceptor for electrophotography, and more specifically to a method for surface-processing of a base, which is made from an aluminum material, of a photoreceptor for electrophotography.

In an electrophotographic copier, a digital copier, a laser printer, or the like, an electrophotographic photoreceptor on which a photoconductive layer is provided on a base of a rotatable drum-like electrophotographic photoreceptor (which is called "base", hereinafter), is commonly used. As a material of the base, an aluminum material is preferably used since it is low in cost, light in weight, processing is easy, and the like. The rotatable drum-like base, which is made from aluminum material, is generally made by machining the surface of a pipe, and a cutting liquid is normally used at that time. This cutting liquid is used for the purpose of cooling, lubricating and cleaning, and specifically, petroleum, polybutene, kerosine, white kerosine, or the like are used for the cutting liquid. Further, in order to prevent an image defect, cleaning is conducted also on the surface of the base by a contact type cleaning means utilizing a brush or an abrasive material after machining of the base.

The following technologies have been proposed conventionally as specific technologies relating to a method for surface-processing of a base of a photoreceptor for electrophotography:

(1) Technology in which machining of an electorophotographic photoreceptor base is conducted by using a cutting oil which contains not more than 1.0 weight % of an oiliness improver and/or an extreme pressure additive. (Japanese Patent Publication Open to Public Inspection, (hereinafter, called Japanese Patent O.P.I ) No. 307463/1988.)

(2) Technology in which a surface of an electrophotographic photoreceptor base made from aluminum alloy which contains silicon, copper, and titanium in a ratio of a specific range is machined by means of a cutting tool having roundness on a cutting portion. (Japanese Patent O.P.I. No. 86151/1989.)

(3) Technology in which an electrophotographic photoreceptor base made from aluminium alloy which contains silicon and iron in a ratio of a specific range, is used. (Japanese Patent O.P.I. No. 86152/1989.)

(4) Technology in which a surface of an electrophotographic photoreceptor base made from aluminium alloy which contains silicon, magnesium, and iron in a ratio of a specific range, is machined by means of a cutting tool having roundness on a cutting portion. (Japanese Patent O.P.I. No. 86153/1989.)

(5) Technology in which an electrophotographic photoreceptor base made from aluminium alloy which contains silicon, magnesium, and iron in a ratio of a specific range, is used. (Japanese Patent O.P.I. No. 86154/1989.)

(6) Technology in which an electrophotographic photoreceptor base made from aluminium alloy which contains magnesium, silicon, copper, and titanium in a ratio of a specific range, is used. (Japanese Patent O.P.I. 86155/1989.)

(7) Technology in which an electrophotographic photoreceptor base made from aluminium alloy which contains silicon, iron, and magnesium in a ratio of a specific range and other metal in not more than a specific ratio, is used. (Japanese Patent O.P.I. 123245/1990.)

(8) Technology in which a surface machining apparatus which is composed of a lathe unit, a high pressure liquid blasting unit and a conveyance unit for an electrophotographic photoreceptor base, and by which lathe machining and pressure liquid blasting can be automatically conducted in succession, is used. (Japanese Patent O.P.I. No. 172573/1990.)

(9) Technology in which a specific nozzle apparatus for cutting liquid supply having a main shaft head which rotatably supports a main shaft to which a rotating tool having an oil hole and a rotating tool not having an oil hole are provided, is used. (Japanese Patent O.P.I. No. 152642/1987.)

(10) Technology in which high pressure water is blasted from a jet nozzle which is connected with a high pressure water supply source onto the surface of an electrophotographic photoreceptor base so that it may be scanned by the nozzle and roughened into a predetermined surface roughness. (Japanese Patent O.P.I. No. 264764/1988.)

However, in the conventional technology, there is a possibility that environmental foreign material such as cutting powder of aluminium, dust and refuse, and stain or the like deposits firmly on a surface of a base made from aluminium material which is surface-machined using a cutting oil, as they are contained in the cutting oil. When left for a period more than a month, for example, especially under high temperature and high humidity in summer, the aforementioned deposit becomes more firmly attached, and corrosion is caused partially on the surface of the base. There is a case in which the corrosion can not be recognized by visual observation.

The aforementioned type of corrosion can not be perfectly eliminated by the method in which the base is dipped into an organic solvent or an interfacial active agent solution, or is cleaned by means of noncontact cleaning such as ultrasonic cleaning or ultraviolet/$O_3$ irradiation cleaning. Accordingly, when a photoreceptor layer is provided on a surface of a base, on which corrosion exists, an image defect is generated on the corroded portion and especially, when the photoreceptor layer is applied to an image forming process in which a non-contact developing method is adopted, there are problems in which black spots, black stripes, and a partial gray background are generated.

Partial corrosion on the surface of the base can be almost completely eliminated by the method in which the aforementioned surface of the base is cleaned by contact-cleaning using a brush or abrasives. However, the surface of the base is damaged depending on the kind of aluminium material, and since the film thickness of a photoconductor formed on the flaw, especially that of a carrier generation layer, tends to be changed, and photo-sensitivity of the photoreceptor layer is changed, there is a problem in which contrast is generated in a half tone image, which results in an image defect.

Furthermore, in the base made from aluminium material having a surface roughness of 0.3 to 2.0 $\mu m R_{max}$ and some 5 to 15 minute grooves within 0.1 mm in length, oil, cutting powder, or environmental foreign matter become deposited in the minute grooves, and when left, since the stuck matter can not be removed only by a brush or abrasives, it causes an image defect. Therefore, sometimes, an electrophotographic photoreceptor base of high quality can not be obtained.

Furthermore, in the base made from aluminium material the surface of which is machined by using cutting oil as in the case of the prior art, it is necessary to clean by using a chlorine solvent such as trichloroethylene, 1,1,1-trichloroethane, perchloroethylene, methylene chloride, and the like in order to remove cutting oil sufficiently. Accordingly, using a large quantity of such a solvent causes problems of environmental contamination and working safety from the viewpoint of ozone layer destruction, carcinogenicity, and the like.

Furthermore, in the aforementioned engineering (10), since processing of a surface of the base is conducted by jetting high pressure water, uniform processing is difficult.

Inventors of the present invention have found causes of the generation of image defects as follows: cutting powder and environmental foreign matter generated at the time of surface processing of the base become deposited on the surface of the base making the cutting oil act as a binder; or the cutting oil itself is decomposed to deposit firmly on the surface of the base; or the cutting oil is deposited firmly on the surface of the base through chemical reaction. Furthermore, the inventors have found that when the cutting liquid is water or an aqueous solution composed of an interfacial active agent or a soluble organic solvent, instead of the cutting oil, and the surface of the base is machined by a cutting tool made of a sintered polycrystal diamond, image defects are reduced, cleaning after processing is easy, and freon or a chlorine solvent are unnecessary, or even when they are used, only a small quantity is used. The inventors of the present invention have found that it is possible to provide an electrophotographic photoreceptor base of high quality, and have completed the present invention.

SUMMARY OF THE INVENTION

The object of the present invention is to provide a surface processing method in which an electrophotographic photoreceptor base having a surface which has excellent cleaning property and which causes less image defects, can be obtained.

The surface processing method of of an electrophotographic photoreceptor base of the present invention is characterized in that: the surface of the aforementioned base is machined by a cutting tool made from a sintered polycrystal diamond, while a cutting liquid of water is being supplied on the surface of the electrophotographic photoreceptor base made from aluminium material.

A supply quantity of the cutting liquid of water is preferably not less than 0.003 ml/cm$^2$.

Furthermore, the electrophotographic photoreceptor base is preferably machined in such a manner that: surface roughness of the base is 0.3 to 3.0 $\mu$m$R_{max}$.

Furthermore, the surface of the electrophotographic photoreceptor base is preferably machined in such a manner that: 5 to 100 minute grooves determined by the particle size of a sintered polycrystal diamond of which the cutting tool is composed, exist on the surface of the base per feed pitch in the feeding direction of the cutting tool.

Another surface processing method of a electrophotographic photoreceptor base of the present invention is characterized in that: while a cutting liquid made of an aqueous solution of an interfacial active agent or a soluble organic solvent is being supplied on the surface of the electrophotographic photoreceptor base, the surface of the base is machined by a cutting tool made from a sintered polycrystal diamond.

When water, or an aqueous solution composed of an interfacial active agent solution or a soluble organic solvent is used for the cutting liquid, adhesion or deposition of aluminium cutting powder, or environmental foreign matter such as dust or refuse to the surface of the base is effectively prevented. Even when deposition occurs, it does not stick firmly. Therefore, cleaning is easy after the process, and productivity is improved since the number of cleaning process is reduced. When contact cleaning is conducted using a brush or abrasive material, rubbing force in the cleaning process can be so weak that there is a low possibility of the occurrence of flaws on the surface of the base. Since it is not necessary to use freon or a chlorine solvent for the cleaning, problems of environmental contamination and working safety are not caused. Further, the cost of the cutting liquid can be lowered. Furthermore, since water or the cutting liquid composed of an interfacial active agent or a soluble organic solvent has a higher cooling effect than that of oil-based cutting liquid, the life of the cutting tool can be prolonged. Since a preferable film can be formed on the contact interface between the cutting tool and the base by the cutting liquid made of an aqueous solution composed of the interfacial active agent or the soluble organic solvent, better lubricating effect can be provided compared with water, and there is a low possibility of causing corrosion on the surface of the electrophotographic photoreceptor base made from aluminium material.

By the electrophotographic photoreceptor composed of the electrophotographic photoreceptor base which has been machined in such a manner that: the surface roughness of the base is 0.3 to 3.0 $\mu$m$R_{max}$, more preferably 0.3 to 1.0 $\mu$m$R_{max}$; and 5 to 100 minute grooves determined by the particle size of a sintered polycrystal diamond of which the cutting tool is composed, exist on the surface of the base for each feed pitch in the feed direction of the cutting tool, when the photoreceptor is applied to an exposure process using a laser beam such as a digital copier, a laser printer, and the like, the occurrence of an interference fringe (moire) is effectively prevented.

DESCRIPTION OF THE PREFERRED EMBODIMENTS

Figure 1:
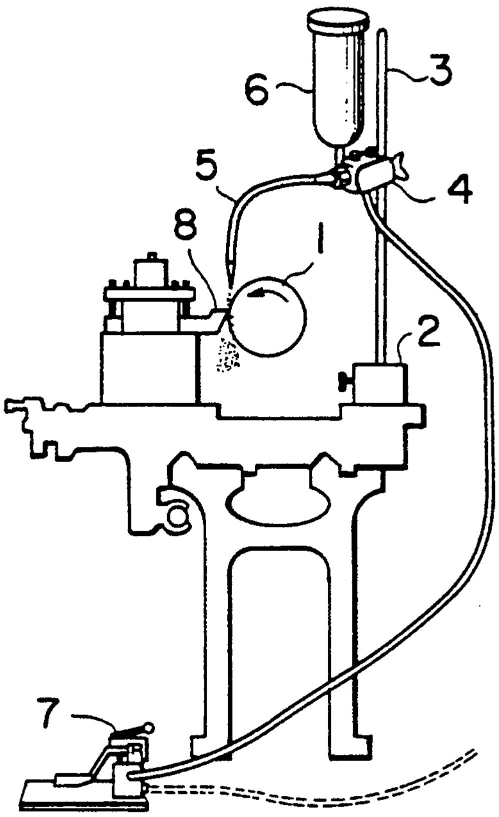
FIG. 1 is an illustration which explains a lathe for base machining.
Figure 2:
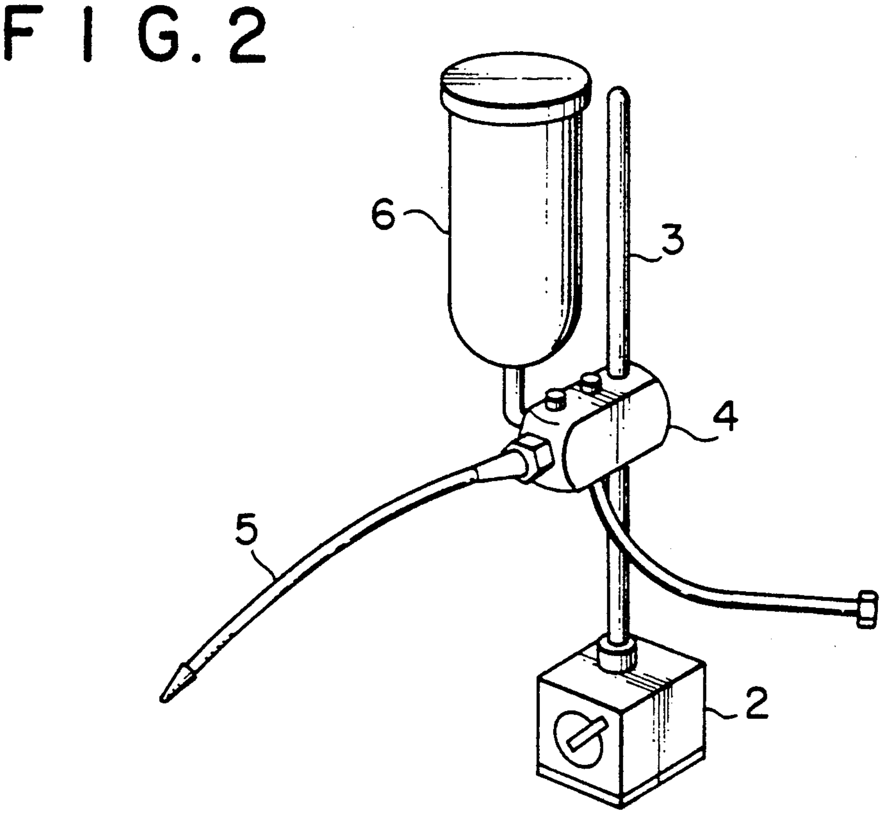
FIG. 2 is a perspective view of an atomizing apparatus for a cutting liquid.

The surface processing method of an electrophotographic photoreceptor base of the present invention is characterized in that: the surface of the aforementioned base is machined by a cutting tool made from a sintered polycrystal diamond, while a cutting liquid of water is supplied on the surface of the electrophotographic photoreceptor base made from aluminium material.

A1070, A 1100, A3003, A5005, A5805, A6063, and the like regulated by JIS are used for aluminium material. The shape of the base is not specifically limited, and it may be a rotatable drum-like base, or an endless sheet belt like base.

Water is used for the cutting liquid, and it is preferably supplied to the surface of the base in the form of a mist by using, for example, "magic-cut" made by Fuso Seiki Co., Ltd. Firm deposition of cutting powder or environmental foreign matter which is generated in the cutting process onto the surface of the base, can be effectively prevented by using a water-mist, and even when the cutting powder enters the space between minute grooves, it can be easily removed. Furthermore, since the cutting powder does not firmly deposit on the surface of the base, cleaning can be easily conducted, and accordingly, it is not necessary to use freon, or chloride solvents, and there is no possibility of causing a problem in environmental sanitation. Even when contact cleaning using a brush is applied to the process, cleaning can be sufficiently conducted by a weak rubbing force, and therefore, there is no possibility of causing a flaw, which is a cause of image defects, on the surface of the base. Even when the cutting powder or the environmental foreign matter are left for a long period of time on the surface of the base, there is no possibility that they stick firmly onto the surface of the base. Furthermore, in the surface machining process, a uniform and strong oxide film is formed by the water-mist on the surface of the base made from aluminium material, and therefore, the condition of the surface of the base can be stable, and there is no possibility of causing partial corrosion.

From the viewpoints of cooling action, lubricating action, and cleaning action, the quantity of water to be supplied for the cutting liquid is preferably not less than 0.003 ml/cm$^2$.

As specific examples of water for the cutting liquid, there are pure water, city water, well water, and a combination of them.

From the viewpoints of cushioning action by the water-mist, and the prevention of pitting corrosion and nodular pitting corrosion by reaction of aluminium, additional metal and the water-mist on the surface machining of the base, the followings are preferable: specific resistance of the water-mist is 2 kΩcm to 10 MΩ/cm; conductivity of the water-mist is 0.05 to 500 μS/cm; and electrolytic density is 0.05 to 250 ppm.

Furthermore, from the viewpoints of prevention of nodular pitting by the water-mist, and prevention of general corrosion accompanied by needle pitting, total hardness of the water-mist is preferably not more than 50 ppm, and chlorine ion density is preferably not more than 20 ppm. Especially, when the ratio of the total hardness to chlorine ion density is 1:1, general corrosion occurs, and it preferably causes no image defect. However, when the total hardness (calcium, magnesium) of the water-mist exceeds 50 ppm, and well water or city water in which chloride ion density exceeds 20 ppm, is used, pitting corrosion is caused on the machined surface of the base made from aluminium material, in the surface machining process, and especially, when it is applied to the reversal-development process, black spots , black stripes, or a partial gray background occur sometimes on the image.

When the water-mist is applied to the reversal development process, from the viewpoint of prevention of occurrence of some gray background on the image, dissolved solids of the water-mist are preferably not more than 100 ppm. From the viewpoint of prevention of occurrence of a partial gray background (a mass of relatively small black points), the number of minute particles (not less than 1 μm) of the water-mist is preferably not more than 1000/ml.

Furthermore, when the water-mist is formed by extrapure water which has a specific resistance of about 17.5 MΩ/cm, the surface of the base is unequally corroded (oxidation), independently of the kind of aluminium material, and especially when it is applied to the reversal-development process, the partial gray background occurs sometimes on the image.

In the present invention, a cutting tool made from sintered polycrystal diamond is used for the cutting tool. While a normal sintered polycrystal diamond is used in the rough-machining process, a cutting tool made from sintered polycrystal diamond having the characteristics in which particle size is about 0.5 μm, and the radius of the roundness of its nose is not less than 20 mm, is preferably used in the finish-machining process. When a nose having a large radius is used, the maximum height $R_{max}$ in the feed pitch of the cutting tool is reduced, and the machined surface can be easily cleaned by a cleaning brush. That is, the shape of the machined surface has the characteristics as follows: the maximum height $R_{max}$ of the shape is small and its pitch is large; and a fur tip of the brush is broken in the surface. When the radius of the nose is increased and the maximum height $R_{max}$ is equal, the feed pitch of the cutting tool can be increased, and it is also effective for tact-time. However, when the radius R is increased too much, like a flat cutting tool (R=300), arrangements for the cutting tool becomes difficult, resulting in difficult surface machining.

In this case, the maximum height $R_{max}$ was measured in accordance with JIS B0601-1982. The measuring apparatus used in this case was "surface roughness tester SE-30H" (made by Kosaka Laboratory Ltd.), which is a tracer type surface roughness tester regulated by JIS B0651, and the nominal value of the radius of curvature of the probe tip used in the measurement was 2 μm.

For surface machining, the following conditions are preferable: in the rough-machining process, the number of revolutions of the main shaft is 2000 to 6000 rpm, the depth of cut is 0.1 to 0.2 mm, and the feed pitch is about 0.2 mm/rev; and in the finish-machining process, the number of revolutions of the main shaft is 2000 to 6000 rpm, the depth of cut is 20 μm, and the feed pitch is about 0.2 mm/rev. In this case, the number of revolution of the main shaft is changed according to the outer diameter of the pipe-like base, and therefore, it can not be generally regulated.

In the present invention, machining is preferably conducted in such a manner that: the surface roughness of the base is 0.3 to 3.0 μm$R_{max}$, and preferably 0.3 to 1.0 μm$R_{max}$. Furthermore, the machining is preferably conducted in such a manner that: 5 to 100 minute portions determined by the particle size of the sintered polycrystal diamond which composes the cutting tool, and preferably 5 to 40 minute portions, exist on the surface of the base at each feed pitch in the feed direction of the cutting tool.

In this case, the minute portion was measured by the same way as the aforementioned measurement of the maximum height $R_{max}$, and though the size of the minute portion which can be measured differs with the radius of curvature of a probe tip to be used, a probe tip having a radius of curvature of the nominal value of 2 μm, is used in an example.

Although a machine tool which can be used for the surface machining, is not specifically limited, a lathe for base machining as shown in FIG. 1, for example, is recommended. In FIG. 1, numeral 1 is a drum-like base, numeral 2 is a magnetic base, numeral 3 is a holder, numeral 4 is an atomizer, numeral 5 is an atomizing nozzle, numeral 6 is a cutting liquid container, numeral 7 is an air valve actuator, and numeral 8 is a cutting tool. When an operator steps on the air valve actuator 7, air is fed to the atomizer 4, and a cutting liquid, that is, a water-mist is atomized from the atomizing nozzle 5 of the cutting liquid container 6 to the contact portion between the cutting tool 8 and the base 1. As a specific example of an atomizing device of the cutting liquid, "magic-cut" (made by Fuso Seiki Co.,Ltd.) is recommended.

The surface-machined base is processed by a cleaning process. The surface of the base to which the surface-machining method of the present invention is applied, can be easily cleaned, and therefore, the cutting powder can be easily cleaned by brush cleaning, for which weak rubbing force is necessary, ultrasonic cleaning, pure water cleaning and the like. Accordingly, deposition of the cutting powder to the surface of the base can be sufficiently prevented. The base which has been cleaned in the cleaning process, is processed in the next dry process. For example, steam is used for a drying means. The electrophotographic photoreceptor base which has been surface-machined by the method of the present invention, is used to compose an electrophotographic photoreceptor which is used for an electrophotographic copier, a digital copier, a laser printer, and the like, and such an electrophotographic photoreceptor is composed of, for example, an organic photosensitive layer which has a carrier generation layer and a carrier transport layer on the surface of the base.

EXAMPLE 1

While the cutting liquid was being supplied on the surface of the base, the surface of the base was machined by a cutting tool according to the conditions described below. Next, it was cleaned, and then an electrophotographic photoreceptor base which was surface machined, was obtained. Surface roughness of the base was 0.65 μmRmax, and the number of minute portions was 20 at each pitch in the feed direction of the cutting tool.

(1) Base

The base was made from aluminium material, and a rotating drum-like base, made from A40S (6000) made by Kobe Steel, Ltd., which had an outer diameter of 60 mm, and a length of 273 mm was used. A40S contains magnesium of 0.55 weight %, silicon of 0.12 weight %, iron of 0.05 weight %, titanium of 0.01 weight %, zinc of 0.01 weight %, and manganin of not more than 0.01 weight %.

(2) Cutting liquid

City water, which had specific resistivity of 5 kΩ,was used.

(3) Supply quantity of cutting liquid

A quantity of 0.003 ml/cm$^2$ of cutting liquid was supplied.

(4) Machine tool

A lathe for the base machining shown in FIG. 1, provided with "magic-cut" (made by Fuso Seiki Co.,Ltd.) for an atomizing device of the cutting liquid, was used.

(5) Cutting tool

In the rough-machining process, a cutting tool made from sintered polycrystal diamond, which had a nose R of 3 mm, and particle size of 5 μm, was used.

In the finish-machining process, a cutting tool made from sintered polycrystal diamond, which had a nose R of 20 mm, and particle size of 0.5 μm, was used.

(6) Machining conditions

In the rough-machining process, the number of revolutions of the main shaft was 3000 rpm, feed pitch was 0.2 mm/rev, and depth of cut was 0.2 mm.

In the finish-machining process, the number of revolutions of the main shaft was 3000 rpm, feed pitch was 0.2 mm/rev, and depth of cut was 20 μm.

EXAMPLES 2 To 6

Apart from the conditions of Table 1 and Table 2 shown below, an electrophotographic photoreceptor base which was surface-machined, was obtained in the same manner as described in Example 1. The surface roughness of the surface of each base, and the number of minute portions at each pitch in the feed direction of the cutting tool is shown in Table 2.

COMPARATIVE EXAMPLE 1

Except that the cutting liquid was changed to "D110" made by Esso Oil Co., Ltd. in Example 4, an electrophotographic photoreceptor base for comparison was obtained in the same way as the example described above. "D110" is a nonaqueous cutting liquid which contains paraffinic hydrocarbon of 54% and naphthene hydrocarbon of 46%. The surface roughness of the base was 0.68 μmRmax, and the number of minute portions at each pitch in the feed direction of the cutting tool was 19.

COMPARATIVE EXAMPLE 2

Except that the cutting liquid was changed to "Daphne cut Revised 6930" made by Idemitsu Kosan Co., Ltd. in Example 4, an electrophotographic photoreceptor base for comparison was obtained in the same way as Example 4. "Daphne cut Revised 6930" is a nonaqueous cutting liquid which contains sulfur as an additive in hydrocarbon which contains naphthene. The surface roughness of the base was 0.68 μmRmax, and the number of minute portions at each pitch in the feed direction of the cutting tool was 20.

COMPARATIVE EXAMPLE 3

Except that the cutting tool for finishing was changed to a cutting tool made from monocrystal diamond having nose R of 20 mm, and the cutting liquid was changed to "D110" made by Esso Oil Co., Ltd. in Example 1, an electrophotographic photoreceptor base for comparison was obtained in the same way as in Example 1. The surface roughness of the base was 0.30 μmRmax, and the number of minute portions at each pitch in the feed direction of the cutting tool was 0.

TABLE 1

| | Material of base | Cutting liquid | Material of cutting tool (cutting tool for finishing) | Nose R of cutting tool for finishing |
|---|---|---|---|---|
| Example 1 | A40S | city water | sintered polycrystal diamond | 20 |
| Example 2 | A40S | city water | sintered polycrystal diamond | 20 |
| Example 3 | A40S | city water | sintered polycrystal diamond | 20 |
| Example 4 | A40S | pure water | sintered polycrystal diamond | 20 |
| Example 5 | A40S | city water | sintered polycrystal diamond | 5 |
| Example 6 | A40S | city water | sintered polycrystal diamond | 10 |
| Comparative Example 1 | A40S | D110 | sintered polycrystal diamond | 20 |
| Comparative Example 2 | A40S | revised 6930 | sintered polycrystal diamond | 20 |
| Comparative Example 3 | A40S | D110 | monocrystal diamond | 20 |

TABLE 2

| | Cutting liquid supply (ml/cm$^2$) | Surface roughness | Number of minute portions |
|---|---|---|---|
| Example 1 | 0.003 | 0.65 μm | 21 |
| Example 2 | 0.03 | 0.65 μm | 19 |
| Example 3 | 0.06 | 0.65 μm | 20 |
| Example 4 | 0.003 | 0.70 μm | 20 |
| Example 5 | 0.03 | 2.9 μm | 21 |
| Example 6 | 0.03 | 1.5 μm | 20 |
| Comparative Example 1 | 0.003 | 0.68 μm | 19 |
| Comparative Example 2 | 0.003 | 0.68 μm | 20 |
| Comparative Example 3 | 0.003 | 0.30 μm | 0 |

Evaluation by practical copying

Using an electrophotographic photoreceptor base which was obtained in the above-mentioned Examples 1 to 6, and Comparative Examples 1 to 3, an electrophotographic photoreceptor provided with an organic photosensitive layer of the functional separation type, composed of 2 layers, was produced in the way described below, after an under coating layer, a carrier generation layer, and a carrier transport layer were laminated in order.

(1) Under coating layer

Using toluene and 2-butanone (MEK) for a solvent for coating and Elvax 4260 (ethylene copolymer) for a binder, an under coating layer, whose film thickness was 0.2 μm after drying, was provided on the electrophotographic photoreceptor base.

(2) Carrier generation layer

Using 2-butanone (MEK) for a coating solvent, KR-5240 (silicon resin) for a binder (solution), and $\tau$ type nonmetallic phthalocyanine for a carrier generation substance, a carrier generation layer, whose deposited amount after drying was 4 mg/dm$^2$, was provided on the above-mentioned under coating layer.

(3) Carrier transport layer

A carrier transport layer, whose film thickness was 20 μm after drying, was provided on the above-described carrier generation layer by using: 1, 2-dichloroethane for a coating solvent, Iupilon Z-200 (polycarbonate BPZ) for a binder, ED-485 (styryltriphenylamine) for a carrier transport substance, Irganox-1010 (penta-erythryl-tetrakis [3-(3, 5-di-tertialy-buthyl-hydroxyphenyl) propionate]) for antioxidant, and KF-54 (1/10 dilution liquid) for silicone oil.

Each of the above-described electrophotographic photoreceptors was mounted on a laser printer (LP 3115) made by Konica Corporation, and a practical copying test in which an image was formed on normal paper of A4 size by the method of reversal development, was conducted. Then, image quality, black spots, black stripes, and moire were evaluated as follows. In this case, charging voltage was set to 450 V so that black spots, black stripes and fog could be easily generated. In the evaluation of the image, a mark A was marked when black spots and fog were not generated, a mark B was marked when some black spots were generated but fog was not generated, and a mark C was marked when black spots and fog were generated. The above-described result is shown in the following Table 3.

TABLE 3

| | Image quality | Black spot (pcs/A4) | Black stripe (pcs/A4) | Existence of moire |
|---|---|---|---|---|
| Example 1 | A | 0 | 0 | no |
| Example 2 | A | 0 | 0 | no |
| Example 3 | A | 0 | 0 | no |
| Example 4 | B | 2 | 0 | no |
| Example 5 | B | 2 | 0 | no |
| Example 6 | B | 3 | 0 | no |
| Comparative Example 1 | C | not less than 100 | 8 | no |
| Comparative Example 2 | C | not less than 100 | 7 | no |
| Comparative Example 3 | C | 0 | 0 | yes |

EXAMPLES 7 TO 11

Except that a cutting liquid was changed to that shown in the following Table 4 and Table 5, each surface machined electrophotographic photoreceptor base was obtained in the same way as Example 1. In this case, the cutting liquids shown in Table 4 and Table 5 were produced as follows. Extrapure water (specific resistivity not more than 17.5 MΩ/cm) was produced by using an extrapure water producing apparatus made by Nomura Micro Co., Ltd., and then proper amounts of city water and well water were mixed into the extrapure water and they were adjusted. When these electrophotographic photoreceptor bases were evaluated in the same way as in the case of the aforementioned practical copy evaluation, excellent results were obtained.

TABLE 4

| | Characteristics of cutting liquid | | | |
|---|---|---|---|---|
| | Specific resistivity | Conductivity | Electrolytic concentration | Total hardness |
| Example 7 | 2.5 kΩ/cm | 400 μS/cm | 200 ppm | 40 ppm |
| Example 8 | 8 Ω/cm | 0.15 μS/cm | 0.08 ppm | 0.02 ppm |
| Example 9 | 50 kΩ/cm | 20 μS/cm | 10 ppm | 2 ppm |

TABLE 4-continued

| | Characteristics of cutting liquid | | | |
|---|---|---|---|---|
| | Specific resistivity | Conductivity | Electrolytic concentration | Total hardness |
| Example 10 | 5 kΩ/cm | 200 μS/cm | 100 ppm | 30 ppm |
| Example 11 | 10 kΩ/cm | 100 μS/cm | 50 ppm | 15 ppm |

TABLE 5

| | Characteristics of cutting liquid | | |
|---|---|---|---|
| | Chlorine ion concentration | Soluble distillation residue | Number of particles (not less than 1 μm) |
| Example 7 | 15 ppm | 80 ppm | 500 pcs./ml |
| Example 8 | 0.05 ppm | 0.01 ppm | 15 pcs./ml |
| Example 9 | 5 ppm | 20 ppm | 100 pcs./ml |
| Example 10 | 12 ppm | 60 ppm | 800 pcs./ml |
| Example 11 | 14 ppm | 30 ppm | 300 pcs./ml |

In another surface machining method of the present invention, while a cutting liquid made of an aqueous solution of an interfacial active agent solution and a soluble organic solvent was being supplied on an electrophotographic photoreceptor base made from aluminium material, the surface of the base was machined by a cutting tool made from a sintered polycrystal diamond.

An aqueous solution made of an interfacial active agent solution and a soluble organic solvent was used as a cutting liquid as shown in the following Table 6.

As interfacial active agents, the followings are recommended: an anionic interfacial active agent such as higher alkyl sulfonates, higher alcohol sulfuric acid esters, phosphoric acid esters, calboxylates, and the like, a cation interfacial active agent such as benzalkonium chloride, Sapamine type quarterly ammonium salts, pyridinium salts, amine salts, and the like, an amphoteric interfacial active agent such as amino acid type, betain type, and the like, and a nonionic interfacial active agent such as polyethylene glycol type, polyalcohol type, and the like.

As soluble organic solvents, the followings are recommended: straight chain alcohol such as methanol, ethanol, 1-propanol, and the like, branched alcohol such as isopropanol, and the like, and ketone such as acetone, methyl ethyl ketone, and the like.

It is preferable that a cutting liquid supply is not less than 0.003 ml/cm$^2$ from the viewpoint of excellent cooling action, lubricating action, and cleaning action.

It is preferable that viscosity of a cutting liquid is 1.005 to 8 cP (20° C.) from the viewpoint of excellent lubricating action and cleaning action. This viscosity was measured by an "E type viscosity meter" made by Tokyo Keiki Co., Ltd.

It is preferable that surface tension of the cutting liquid is 20 to 80 dyne/cm (20° C.) from the viewpoint of excellent lubricating action and cleaning action. This surface tension was measured by a "Wilhelmy type surface tension meter" made by Kyowa Kagaku Co., Ltd.

It is preferable that specific heat is 50 to 150 J/mol·deg (20° C.) from the viewpoint of excellent cooling action. This specific heat was measured by a Bunsen type water calorimeter.

It is preferable that thermal conductivity of the cutting liquid is $15\times10^{-3}$ to $50\times10^{-3}$ cal/cm.sec.deg (20° C.) from the viewpoint of excellent cooling action. This thermal conductivity was measured by a thermal conductivity measuring apparatus using a thermopile.

It is preferable that latent heat of vaporization of the cutting liquid is 8.0 to 9.7 Kcal/mol (boiling point) from the viewpoint of excellent cooling action. This latent heat of vaporization was measured by an adiabatic calorimeter.

It is preferable that the dielectric constant is 18.0 to 78.5 from the viewpoint of affinity for water, and excellent cleaning action. This dielectric constant was measured by a dielectric constant measuring device which was composed of an electrode and a voltage meter.

In the present invention, from the viewpoint of prevention of the occurrence of an interference fringe (moire) when the photoreceptor is applied to an exposure process by a laser beam, it is desirable to conduct machining on the base in a manner that surface roughness of the base is 0.3 to 3.0 $\mu mR_{max}$. Further, It is desirable to conduct machining in a manner that 5 to 100 minute portions due to the particle size of a sintered polycrystal diamond from which the cutting tool is made, exist in feed length (feed pitch) per one turn of the base in the feed direction of the cutting tool on the surface of the base.

Though a machine tool which can be used for surface machining of the base is not limited to the specific one, for example, a lathe for base machining shown in FIG. 1 is recommended. In FIG. 1, numeral 1 is a drum-like base, numeral 2 is a magnetic base, numeral 3 is a holder, numeral 4 is an atomizer, numeral 5 is an atomizing nozzle, numeral 6 is a cutting liquid container, numeral 7 is an air valve actuator, and numeral 8 is a cutting tool. When an operator steps on the air valve actuator 7, air is fed to the atomizer 4, and a cutting liquid, that is, an aqueous solution made of an interfacial active agent solution or a soluble organic solvent, is atomized from the atomizing nozzle 5 of the cutting liquid container 6 to the contact portion between the cutting tool 8 and the base 1. As a specific example of an atomizing device of the cutting liquid, "magic-cut" (made by Fuso Seiki Co.,Ltd.) is recommended.

The surface machined base is processed in the cleaning process in the same manner as the example described above.

A specific example will be explained as follows.

EXAMPLE 12

While the cutting liquid was being supplied on the surface of the base, the surface of the base was machined by a cutting tool according to conditions described below. Next, it was cleaned, and then an electrophotographic photoreceptor base which was surface-machined, was obtained. Surface roughness of the base was 0.63 μmRmax, and the number of minute portions was 19 at each pitch in the feed direction of the cutting tool.

(1) Base,
(2) cutting liquid,
(3) cutting liquid supply,
(4) machine tool,
(5) cutting tool, and
(6) machining conditions were the same as in the case of the example described above.

EXAMPLES 13 TO 20

Apart from the conditions of Table 1 and Table 2 shown below, an electrophotographic photoreceptor base which was surface-machined, was obtained in the same manner described in Example 12. The surface roughness of the surface of each base, and the number of minute portions at each pitch in the feed direction of the cutting tool are shown in Table 8.

The results of measurement of the physical properties of aqueous solutions of A, B, C and D are shown in the following table 9.

COMPARATIVE EXAMPLE 4

Except that the cutting liquid was changed to "D110" made by Esso Oil Co., Ltd. in Example 12, an electrophotographic photoreceptor base for comparison was obtained in the same way as the example described above. "D110" is a nonaqueous cutting liquid which contains paraffinic hydrocarbon of 54% and naphthene hydrocarbon of 46%. The surface roughness of the base was 0.68 μmRmax, and the number of minute portions at each pitch in the feed direction of the cutting tool was 19.

TABLE 6

| Cutting liquid | Solute | Concentration (weight %) |
|---|---|---|
| Aqueous solution A | methanol | 10 |
| Aqueous solution B | ethanol | 10 |
| Aqueous solution C | isopropanol | 10 |
| Aqueous solution D | acetone | 10 |
| Aqueous solution E | sodium lauryl sulfate | 3 |
| Aqueous solution F | Sapamine MS | 3 |
| Aqueous solution G | stearic acid EO 15 mol addition product | 3 |
| Aqueous solution H | stearyl dimethyl betaine | 3 |
| Aqueous solution I | RBS48S | 3 |
| Nonaqueous solution a | D110 | — |

Sapamine MS: a product of Ciba Co., Ltd. (cation active agent)
Stearic acid EO: stearic acid ethylene oxide
RBS48S: a product by Junsei Chemical Co., Ltd. (a nonionic interfacial active agent)

TABLE 7

| | Material of a base | Cutting liquid | Material of a cutting tool |
|---|---|---|---|
| Example 12 | A40S | Aqueous solution A | Sintered polycrystal diamond |
| Example 13 | A40S | Aqueous solution B | Sintered polycrystal diamond |
| Example 14 | A40S | Aqueous solution C | Sintered polycrystal diamond |
| Example 15 | A40S | Aqueous solution D | Sintered polycrystal diamond |
| Example 16 | A40S | Aqueous solution E | Sintered polycrystal diamond |
| Example 17 | A40S | Aqueous solution F | Sintered polycrystal diamond |
| Example 18 | A40S | Aqueous solution G | Sintered polycrystal diamond |
| Example 19 | A40S | Aqueous solution H | Sintered polycrystal diamond |
| Example 20 | A40S | Aqueous solution I | Sintered polycrystal diamond |
| Comparative example 4 | A40S | Nonaqueous solution a | Sintered polycrystal diamond |

TABLE 8

| | Cutting liquid supply ($ml/cm^2$) | Surface roughness Rmax | Number of minute portions |
|---|---|---|---|
| Example 12 | 0.003 | 0.65 μm | 21 |
| Example 13 | 0.003 | 0.65 μm | 21 |
| Example 14 | 0.003 | 0.65 μm | 21 |
| Example 15 | 0.003 | 0.65 μm | 21 |
| Example 16 | 0.003 | 0.65 μm | 21 |
| Example 17 | 0.003 | 0.65 μm | 21 |
| Example 18 | 0.003 | 0.65 μm | 21 |
| Example 19 | 0.003 | 0.65 μm | 21 |
| Example 20 | 0.003 | 0.65 μm | 21 |
| Comparative example 4 | 0.003 | 0.68 μm | 19 |

TABLE 9

| | Physical properties | | | | | |
|---|---|---|---|---|---|---|
| Cutting liquid | Thermal conductivity | Viscosity | Surface tension | Specific heat | Latent heat of vaporization | Dielectric constant |
| Aqueous solution A | 0.0064 | 1.40 | 50.0 | 4.18 | 9.59 | 73.95 |
| Aqueous solution B | 0.0056 | 1.54 | 47.9 | 4.27 | 9.67 | 73.12 |
| Aqueous solution C | 0.0050 | 1.59 | 53.0 | 4.30 | 9.72 | 72.70 |
| Aqueous solution D | 0.0056 | 1.30 | 52.0 | 4.12 | 9.44 | 72.75 |

In the table, units of the value of each physical property are as follows:

Thermal conductivity: cal/cm.sec.deg (20° C.)
Viscosity: cP (20° C.)
Surface tension: dyne/cm (20° C.)
Specific heat: J/mol·deg (20° C.)
Latent heat of vaporization: Kcal/mol
Dielectric constant: absolute number

Evaluation by practical copying

Using the electrophotographic photoreceptor bases obtained in the above-mentioned Examples 12 to 20, and comparative example 4, an electrophotographic photoreceptor provided with an organic photosensitive layer of functional separation type, composed of 2 layers, was produced under the same conditions as those of Examples 1 to 6 and Comparative examples 1 to 3, after an under coating layer, a carrier generation layer, and a carrier transport layer were laminated in order.

The above-described electrophotographic photoreceptors were practically copy-tested under the same conditions as those of the above-described Examples 1 to 6 and Comparative examples 1 to 3, and after that, image quality, black spots, black streaks and moire were evaluated. The results are shown in the following Table 10.

TABLE 10

| | Image quality | Number of Black spots (pcs/A4) | Number of Black streaks (pcs/A4) |
|---|---|---|---|
| Example 12 | A | 0 | 0 |
| Example 13 | B | 3 | 0 |
| Example 14 | B | 5 | 0 |
| Example 15 | B | 3 | 0 |
| Example 16 | B | 2 | 0 |
| Example 17 | B | 2 | 0 |
| Example 18 | B | 3 | 0 |
| Example 19 | B | 2 | 0 |
| Example 20 | A | 0 | 0 |
| Comparative | C | more than 100 | 8 |

TABLE 10-continued

| | Image quality | Number of Black spots (pcs/A4) | Number of Black streaks (pcs/A4) |
|---|---|---|---|
| e:.ample 4 | | | |

As explained in detail in the foregoing, according to the surface machining method of the present invention, since cleaning after the machining process is easy, an electrophotographic photoreceptor base which causes less image defects such as black spots, black streaks, black stripes, a partial gray background, and the like, can be obtained. Especially, when the base is applied to a reversal development process, black spot generation is prevented, and when it is applied to an exposure process by a laser beam, the generation of moire can be surely and effectively prevented. Further, since the cutting liquid is water, environmental contamination does not occur, and working safety is improved. Since water has a higher cooling effect than that of oil-based cutting liquid, the life of the cutting tool can be prolonged.

Furthermore, according to the surface machining method of the present invention, since a cutting liquid made of an aqueous solution composed of an interfacial active agent or a soluble organic solution is used, a superior effect is obtained compared with only water, and there is almost no possibility that corrosion is generated on the surface of an electrophotographic photoreceptor base which is made from aluminium material. Since cleaning after the surface machining process is easy, an electrophotographic photoreceptor base which causes less image defects such as black spots, black streaks, black stripes, a partial gray back ground, and the like, can be obtained.

What is claimed is:

1. A method of processing the surface of a base of a photoreceptor for electrophotography held on a lathe, comprising the steps of:

(a) supplying cutting fluid to the surface of the base including aluminum material, wherein said cutting fluid is selected from the group consisting of water, an aqueous solution of a surface-active agent and an aqueous solution of a water-soluble organic solvent; and (b) cutting the surface of the base with a cutting tool having a sintered polycrystalline diamond body while the cutting fluid is being supplied.

2. The method of claim 1 wherein the quantity of cutting fluid supplied exceeds 0.003 ml/cm$^2$.

3. The method of claim 1 wherein said cutting step is conducted to provide surface roughness of the base of 0.3 to 3.0 $\mu mR_{max}$.

4. The method of claim 2 wherein said cutting step is conducted to provide surface roughness of the base of 0.3 to 3.0 $\mu mR_{max}$.

5. The method of claim 1 wherein the cutting fluid is water.

6. The method of claim 1 wherein the cutting fluid is an aqueous solution of a surface active agent.

7. The method of claim 1 wherein the cutting fluid is an aqueous solution of a water-soluble organic solvent.

8. A method of processing the surface of a base of a photoreceptor for electrophotography held on a lathe, comprising the steps of:

(a) supplying cutting fluid to the surface of the base including aluminum material, said cutting fluid having one of water, an aqueous solution of a surface-active agent and an aqueous solution of a water-soluble organic solvent;

(b) cutting the surface of the base with a cutting tool having a sintered polycrystalline diamond body while the cutting fluid is being supplied, wherein said cutting step is conducted to provide 5 to 100 minute grooves on the surface of the base, determined by the size of micro-grain of the sintered polycrystalline diamond body of the cutting tool per feed pitch in a feed direction of the cutting tool.

9. The method of claim 2 wherein said cutting step is conducted to provide 5 to 100 minute grooves on the surface of the base, determined by the size of micro-grain of the sintered polycrystalline diamond body of the cutting tool per feed pitch in the feed direction of a cutting tool.

10. The method of claim 3 wherein said cutting step is conducted to provide 5 to 100 minute grooves on the surface of the base, determined by the size of micro-grain of the sintered polycrystalline diamond body of the cutting tool per feed pitch in a feed direction of a cutting tool.

11. The method of claim 4 wherein said cutting step is conducted to provide 5 to 100 minute grooves on the surface of the base, determined by the size of micro-grain of the sintered polycrystalline diamond body of the cutting tool per feed pitch in a feed direction of a cutting tool.

12. The method of claim 8 wherein the quantity of cutting fluid supplied exceeds 0.003 ml/cm$^2$.

13. The method of claim 12 wherein said cutting step is conducted to provide surface roughness of the base of 0.3 to 3.0 $\mu mR_{max}$.

14. The method of claim 8 wherein said cutting step is conducted to provide surface roughness of the base of 0.3 to 3.0 $\mu mR_{max}$.

* * * * *